(12) United States Patent
Fan et al.

(10) Patent No.: US 8,451,301 B2
(45) Date of Patent: May 28, 2013

(54) COLOR DISPLAY DEVICE

(75) Inventors: Shih-Kang Fan, Hsinchu (TW);
Cheng-Pu Chiu, Zhonghe (TW);
Shih-Chiang Chen, Taichung (TW)

(73) Assignee: National Chiao Tung University, Hsinchu (TW)

( * ) Notice: Subject to any disclaimer, the term of this patent is extended or adjusted under 35 U.S.C. 154(b) by 318 days.

(21) Appl. No.: 12/872,914

(22) Filed: Aug. 31, 2010

(65) Prior Publication Data
US 2011/0199403 A1 Aug. 18, 2011

(30) Foreign Application Priority Data
Feb. 12, 2010 (TW) ................................ 99104712 A

(51) Int. Cl.
*G09G 5/10* (2006.01)
*G09G 5/00* (2006.01)

(52) U.S. Cl.
USPC .......................................... 345/691; 345/212

(58) Field of Classification Search
USPC ................. 345/107, 296, 691, 208, 211–213, 345/690, 158
See application file for complete search history.

(56) References Cited

U.S. PATENT DOCUMENTS

| 7,492,505 B2 * | 2/2009 | Liang et al. .................... 359/296 |
| 2009/0135131 A1 * | 5/2009 | Fan et al. ....................... 345/107 |

FOREIGN PATENT DOCUMENTS

| JP | 05-027233 | 2/1993 |
| JP | 2001-255836 | 9/2001 |

OTHER PUBLICATIONS

Korean Intellectual Property Office's Notice of Preliminary Rejection issued in connection with Korean Patent Application No. 10-2010-0104475 and English Translation.

* cited by examiner

*Primary Examiner* — Michael Faragalla
(74) *Attorney, Agent, or Firm* — Occhiuti Rohlicek & Tsao LLP

(57) ABSTRACT

A color display device includes a plurality of pixel display elements and a driving circuit. Each of the pixel display elements includes a plurality of sub-pixel display elements. Each of the sub-pixel display elements includes first and second supports, first and second electrodes attached to inner faces of the first and second supports, respectively, a solution disposed between the first and second electrodes, and particles dispersed in the solution. The particles of the sub-pixel display elements of a same one of the pixel display elements are electrically polarizable by voltage signals supplied by the driving circuit, the voltage signals having the same predetermined driving frequency.

17 Claims, 8 Drawing Sheets

COLOR DISPLAY DEVICE

CROSS-REFERENCE TO RELATED APPLICATION

This application claims priority of Taiwanese Application No. 099104712, filed on Feb. 12, 2010.

BACKGROUND OF THE INVENTION

1. Field of the Invention

This invention relates to a color display device, more particularly to a color display device utilizing particle polarization.

2. Description of the Related Art

U.S. Pat. No. 7,492,505 discloses an electrophoretic display containing an array of electrophoretic cells. Referring to FIGS. 1 and 2, each of the electrophoretic cells includes a top layer 10 containing a top electrode 101, a bottom layer 20 containing a bottom electrode 201 and at least one in-plane electrode 202, and an electrophoretic composition 30 filled therein. The electrophoretic composition 30 contains a dielectric solvent 301 and a group of charged pigment particles 302 that carry the same charge polarity.

Referring to FIG. 1, when there is no voltage difference between the in-plane electrodes 202 (that is, the display is under an off state), the charged pigment particles 302 are dispersed randomly in the dielectric solvent 301, and the color of the electrophoretic display is provided through the group of charged pigment particles 302.

Referring to FIG. 2, when the in-plane electrodes 202 are set at low voltage, the charged pigment particles 302 migrate to sides of the cell, and the color of the electrophoretic display is provided through the dielectric solvent 301 or the background (best shown in the right portion of FIG. 2). When the voltage of the top electrode 101 is set low and the voltage of the bottom electrode 201 is set high, the charged pigment particles 302 migrate to the top electrode 101, and the color of the electrophoretic display is provided through the charged pigment particles 302 (best shown in the left portion of FIG. 2). In this patent, since the in-plane electrodes 202 are necessary, the manufacturing cost is relatively high, and the difficulty in driving the electrophoretic display is also increased.

U.S. Patent Application Publication No. 2009/0135131 discloses a display utilizing a different driving mode. Referring to FIGS. 3 and 4, the display includes first and second substrates 50, 70, first and second electrodes 60, 80 attached to inner faces of the first and second substrates 50, 70, respectively, and a mixed solution 90 disposed between the first and second electrodes 60, 80. The mixed solution 90 contains a solution 901 and a group of neutral micro-particles 902 dispersed in the solution 901.

Referring to FIG. 3, when the display is under an off state, the neutral micro-particles 902 are dispersed randomly in the solution 901. Referring to FIG. 4, when the display is under an on state, the neutral micro-particles 902 are electrically polarized to form a plurality of strings of the neutral micro-particles 902. In an embodiment shown in FIG. 2 of the U.S. patent publication, the display includes a plurality of first neutral micro-particles, a plurality of second neutral micro-particles, and a plurality of third neutral micro-particles. The first neutral micro-particles may be red, the second neutral micro-particles may be green, and the third neutral micro-particles may be blue. The first neutral micro-particles, the second neutral micro-particles, and the third neutral micro-particles have a first driving frequency, a second driving frequency, and a third driving frequency, respectively. Therefore, the first neutral micro-particles, the second neutral micro-particles, and the third neutral micro-particles will be polarized under driving voltages of different frequencies.

SUMMARY OF THE INVENTION

An object of the present invention is to provide a color display device that may be driven in a relatively simple manner.

According to this invention, there is provided a color display device that includes a plurality of pixel display elements and a driving circuit. Each of the pixel display elements includes a plurality of sub-pixel display elements. Each of the sub-pixel display elements includes first and second supports, first and second electrodes attached to inner faces of the first and second supports, respectively, a solution disposed between the first and second electrodes, and particles dispersed in the solution. The first support, the first electrode and the solution are light-transmissive. The particles of the sub-pixel display elements of a same one of the pixel display elements are electrically polarizable under a predetermined driving frequency. The driving circuit is coupled electrically to the sub-pixel display elements for supplying a voltage signal to each of the sub-pixel display elements. The voltage signals supplied to the sub-pixel display elements have the same predetermined driving frequency. The first supports, the second supports, the solutions, and the particles of each of said pixel display elements are provided with respective color properties such that each of the sub-pixel display elements is able to display a first color when in a first display state, in which the particles are non-polarized and are randomly dispersed in the solution, and a second color when in a second state, in which the sub-pixel display element is supplied with the voltage signal having the predetermined driving frequency by the driving circuit to polarize the particles so as to result in formation of strings of the particles in the solution. The sub-pixel display elements of a same one of the pixel display elements display different colors when in one of the first and second display states.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
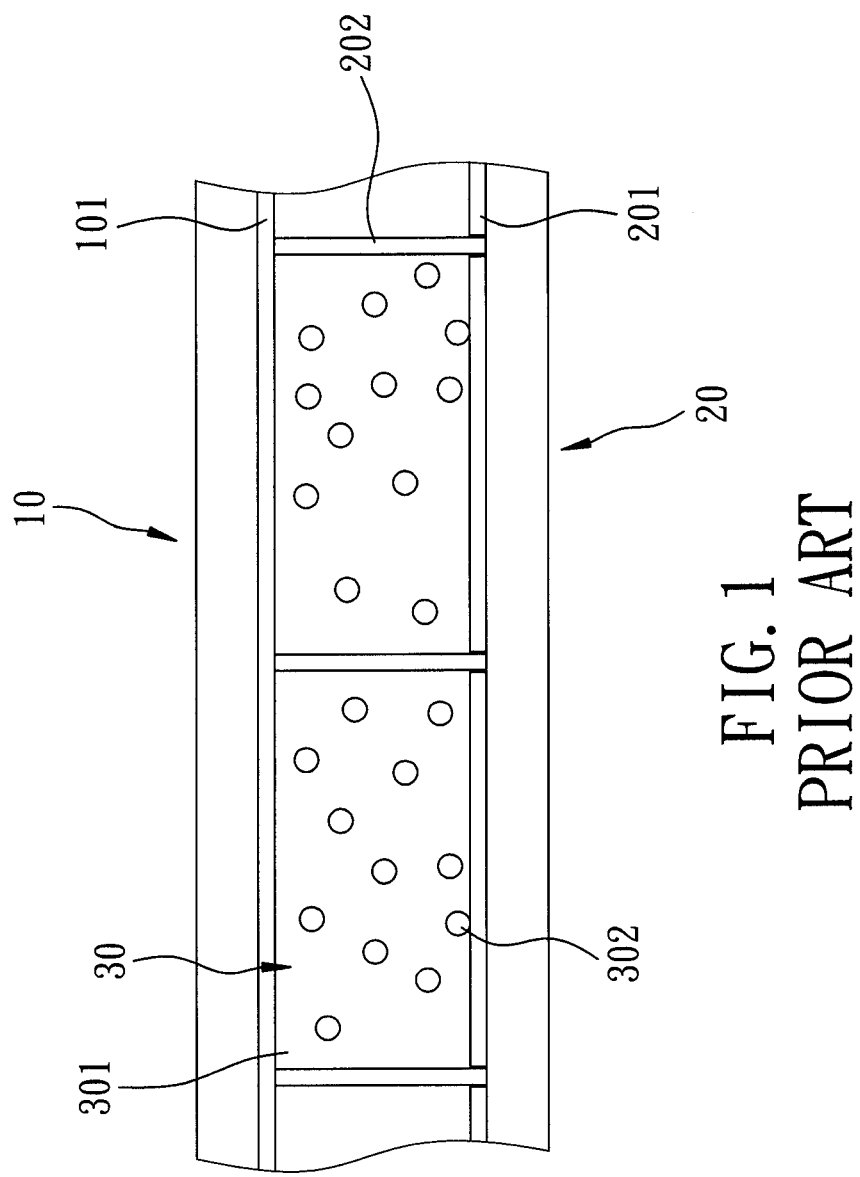
FIG. 1 is a schematic side view of a conventional electrophoretic display under an off state.
Figure 2:
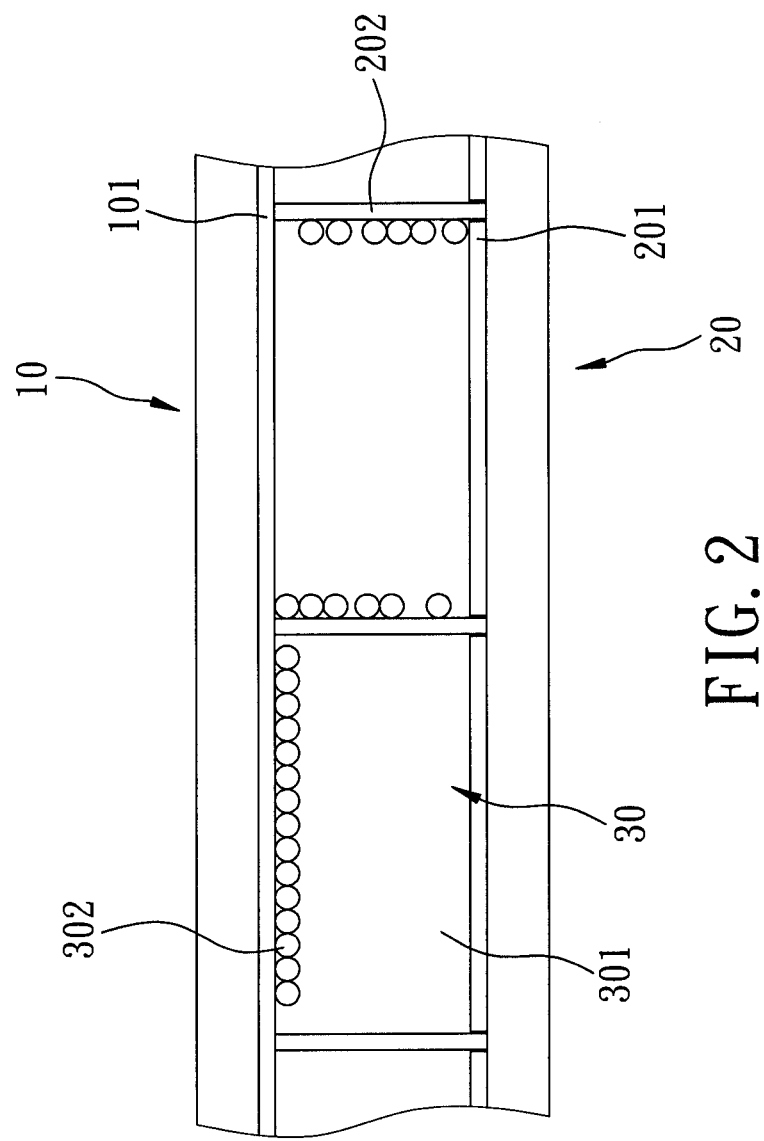
FIG. 2 is a schematic side view of the conventional electrophoretic display under an on state.
Figure 3:
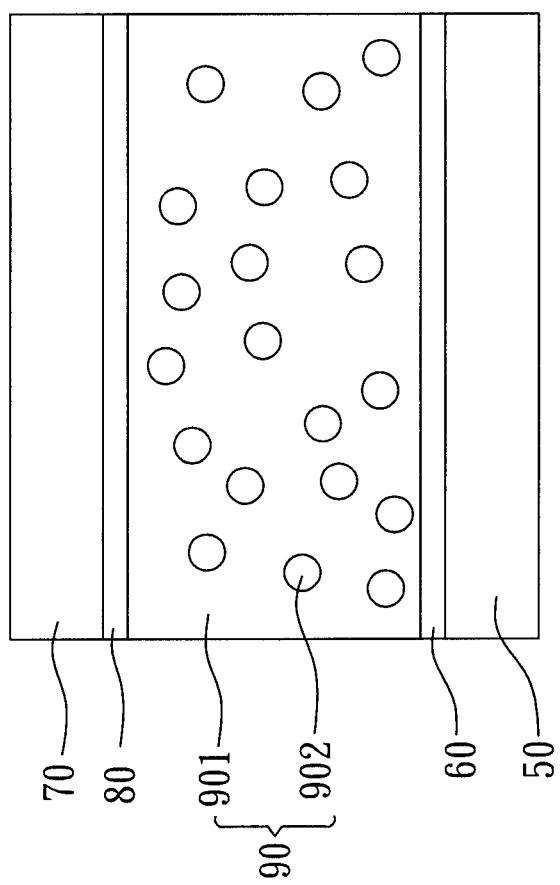
FIG. 3 is a schematic side view of another conventional display under an off state.
Figure 4:
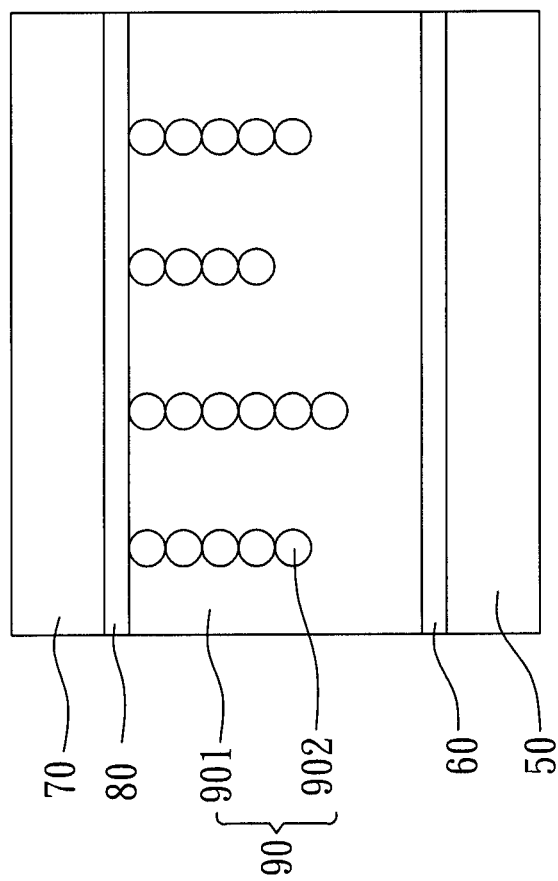
FIG. 4 is a schematic side view of the conventional display of FIG. 3 under an on state.

Before this invention is described in greater detail with reference to the accompanying preferred embodiments, it should be noted herein that like elements are denoted by the same reference numerals throughout the disclosure.

Figure 5:
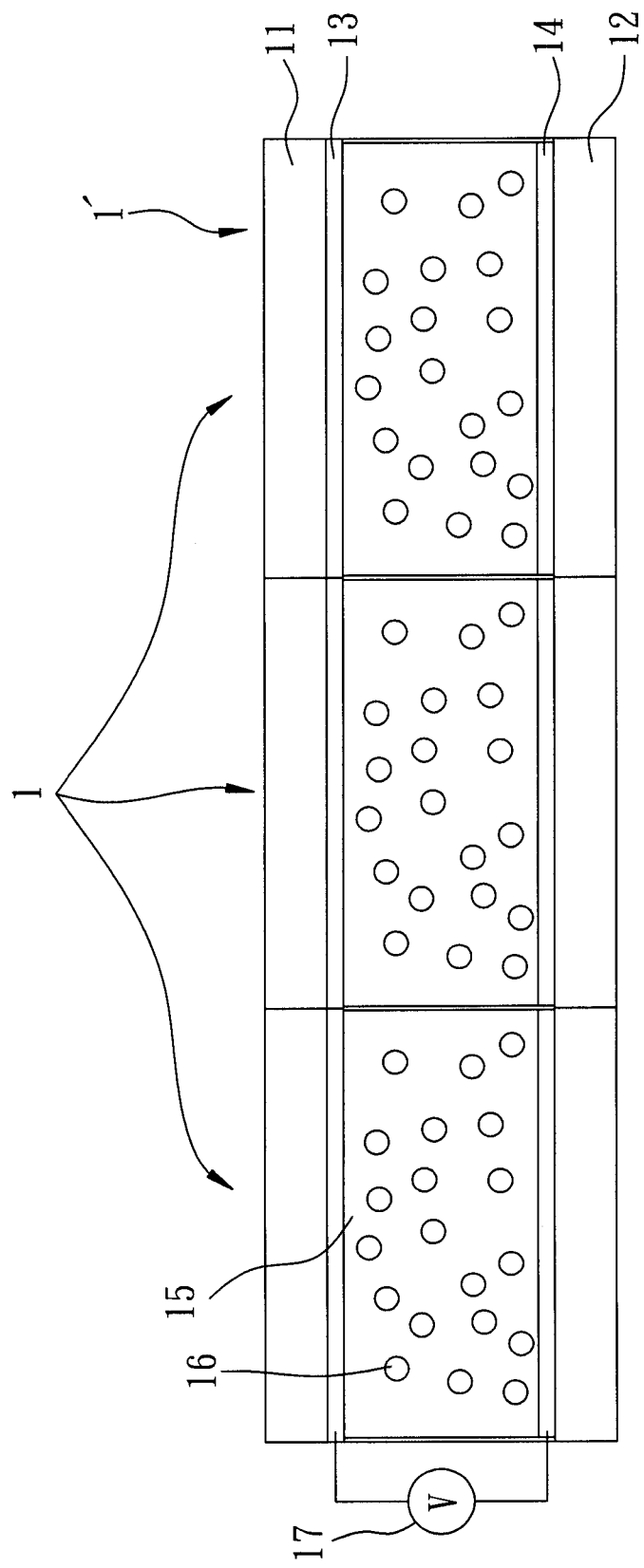
FIG. 5 is a schematic side view of a preferred embodiment of a color display device according to this invention under an off state.
Figure 6:
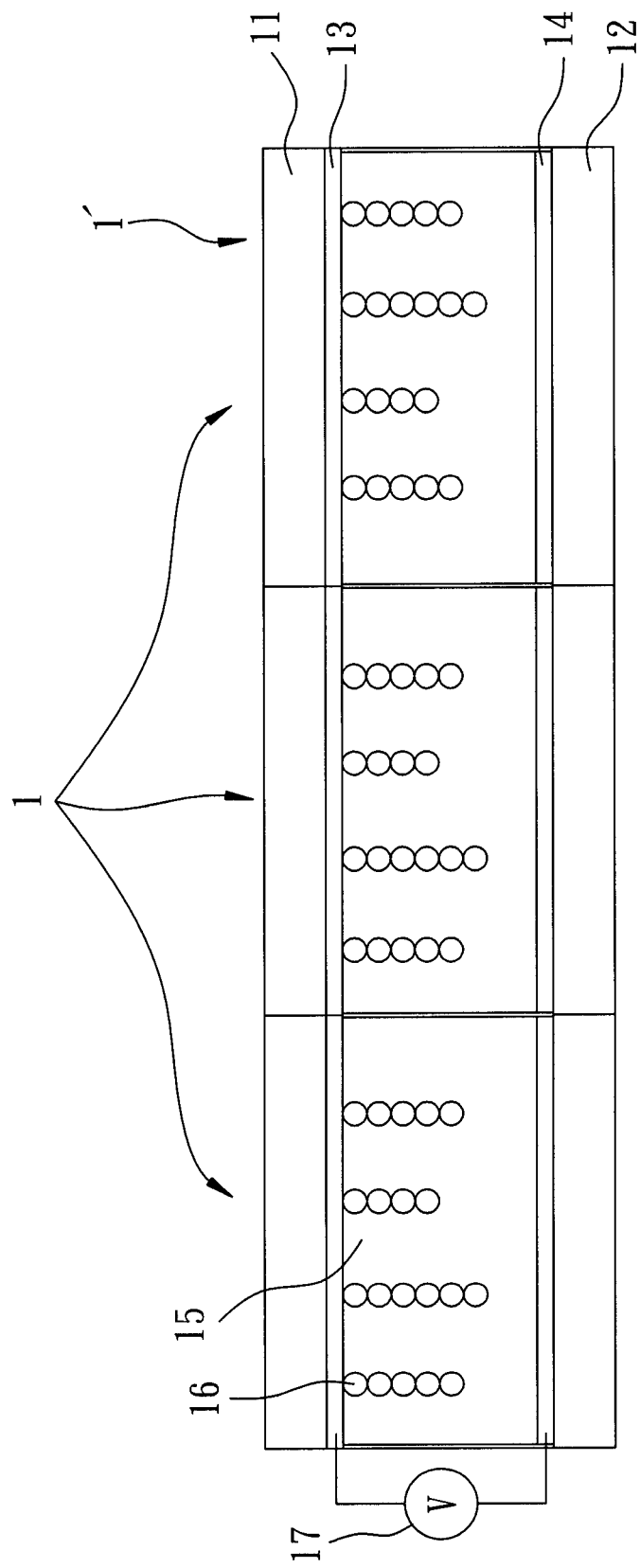
FIG. 6 is a schematic side view of the preferred embodiment under an on state.

Referring to FIGS. 5 and 6, the first preferred embodiment of a color display device according to this invention includes a plurality of pixel display elements 1' (only one is shown in the drawings) and a driving circuit 17. Each of the pixel display elements 1' includes three sub-pixel display elements 1. Each of the sub-pixel display elements 1 includes first and second supports 11, 12, first and second electrodes 13, 14 attached to inner faces of the first and second supports 11, 12, respectively, a solution 15 disposed between the first and second electrodes 13, 14, and particles 16 dispersed in the solution 15.

The first support 11, the first electrode 13 and the solution 15 are light-transmissive, and are transparent in this embodiment. In addition, the solution 15 is preferably a colorless solution.

The particles 16 of the sub-pixel display elements 1 of a same one of the pixel display elements 1' are electrically polarizable under a predetermined driving frequency. In this preferred embodiment, the particles 16 of the sub-pixel display elements 1 are neutral particles, and have uniform weight characteristics so that the particles 16 of the sub-pixel display elements 1 are electrically polarizable under the same predetermined driving frequency. The particles 16 of a same one of the sub-pixel display elements 1 have the same color, and the particles 16 of the sub-pixel display elements 1 of a same one of the pixel display elements 1' have different colors (which are red, green, and blue colors in this preferred embodiment), respectively.

The second support 12 of each of the sub-pixel display elements 1 has one of a white color and a black color. In this preferred embodiment, the second support 12 of each of the sub-pixel display elements 1 has a black color.

The driving circuit 17 is coupled electrically to the sub-pixel display elements 1 for supplying a voltage signal to each of the sub-pixel display elements 1. The voltage signals supplied to the sub-pixel display elements 1 have the same predetermined driving frequency and are not required to have different driving frequencies because the particles 16 of the sub-pixel display elements 1 have uniform weight characteristics.

Specifically referring to FIG. 5, when the driving circuit 17 does not supply a voltage signal to each of the sub-pixel display elements 1, the particles 16 are non-polarized and are randomly dispersed in the solution 15 so that the sub-pixel display elements 1 of a same one of the pixel display elements 1' are able to display red, green, and blue colors, respectively. Therefore, the incident light is reflected by the particles 16, and the three sub-pixel display elements 1 of a same one of the pixel display elements 1' may display a white color or a color that is blended in accordance with the intensities of the red, green and blue particle-reflected lights.

Specifically referring to FIG. 6, when the sub-pixel display element 1 is supplied with the voltage signal having the predetermined driving frequency by the driving circuit 17, the particles 16 are polarized so as to result in formation of strings of the particles 16 in the solution 15. Therefore, the incident light enters into the sub-pixel display elements 1 and is incident upon the black second supports 12 of the sub-pixel display elements 1 so that the three sub-pixel display elements 1 of a same one of the pixel display elements 1' display a black color. It is noted that the sub-pixel display elements 1 of a same one of the pixel display elements 1' may be independently controlled by independently supplying the sub-pixel display elements 1 with the voltage signal having the predetermined driving frequency through the driving circuit 17. It is also noted that the number of the strings of the particles 16 in the sub-pixel display elements 1 may be independently adjusted to cause the three sub-pixel display elements 1 to display a black color or the color of the particles 16 in order to control the brightness.

Preferably, each of the sub-pixel display elements 1 further includes a dielectric layer (which is not shown in FIGS. 5 and 6) disposed between the solution 15 and the second electrode 14.

The second preferred embodiment of a color display device according to this invention has a structure and a driving mode similar to those of the first preferred embodiment, except that in the second preferred embodiment, the second supports 12 of the sub-pixel display elements 1 of a same one of the pixel display elements 1' have different colors (which are red, green, and blue colors in this preferred embodiment), respectively, and the particles 16 of the sub-pixel display elements 1 have a same color selected from the group consisting of white color and black color. In this preferred embodiment, the particles 16 of the sub-pixel display elements 1 have a black color. Moreover, the first supports 11, the first electrodes 13, and the solution 15 are both colorless and transparent.

Therefore, in this preferred embodiment, when the driving circuit 17 does not supply a voltage signal to each of the sub-pixel display elements 1, the particles 16 of black color are non-polarized. The incident light is incident upon the particles 16, and the three sub-pixel display elements 1 of a same one of the pixel display elements 1' display a black color. On the other hand, when the sub-pixel display element 1 is supplied with the voltage signal having the predetermined driving frequency by the driving circuit 17, the particles 16 are polarized so as to result in formation of strings of the particles 16 in the solution 15. The incident light enters into the sub-pixel display elements 1 and is reflected by the second supports 12 of the sub-pixel display elements 1 so that the three sub-pixel display elements 1 of a same one of the pixel display elements 1' display a white color or a color that is blended in accordance with the intensities of the red, green and blue support-rejected lights.

Preferably, the second support 12 of each of the sub-pixel display elements 1 includes a white backlight source and a colored transparent substrate (not shown in FIGS. 5 and 6).

The third preferred embodiment of a color display device according to this invention has a structure and a driving mode similar to those of the first preferred embodiment, except that in the third preferred embodiment, the solutions 15 of the sub-pixel display elements 1 of a same one of the pixel display elements 1' have different colors (which are red, green, and blue colors), respectively, the particles 16 of the sub-pixel display elements 1 have a black color, and the second supports 12 of the sub-pixel display elements 1 have a white color. Moreover, the first supports 11 and the first electrodes 13 are both colorless and transparent.

Therefore, in this preferred embodiment, when the driving circuit 17 does not supply a voltage signal to each of the sub-pixel display elements 1, the particles 16 of black color are non-polarized. The incident light is incident upon the particles 16, and the three sub-pixel display elements 1 of a same one of the pixel display elements 1' display a black color. On the other hand, when the sub-pixel display element 1 is supplied with the voltage signal having the predetermined driving frequency by the driving circuit 17, the particles 16 are polarized so as to result in formation of strings of the particles 16 in the solution 15. The incident light enters into the sub-pixel display elements 1, is reflected by the second supports 12 of the sub-pixel display elements 1, and passes through the colored solutions 15 so that the three sub-pixel display elements 1 of a same one of the pixel display elements 1' display a white color or a color that is blended in accordance with the intensities of the lights passing through the red, green and blue solutions 15.

Preferably, the second support 12 of each of the sub-pixel display elements 1 includes a white backlight source and a transparent substrate coupled to the white backlight source (not shown in FIGS. 5 and 6).

The fourth preferred embodiment of a color display device according to this invention has a structure and a driving mode similar to those of the first preferred embodiment, except that in the fourth preferred embodiment, the first support 11 of each of the sub-pixel display elements 1 includes a transparent substrate and a colored substrate stacked on the transparent substrate. The colored substrates of the sub-pixel display elements 1 of a same one of the pixel display elements 1' have different colors (which are red, green, and blue colors), respectively. Furthermore, the particles 16 of each of the sub-pixel display elements 1 have a black color, and the second support 12 of each of the sub-pixel display elements 1 has a white color. The solution 15 is both colorless and transparent in this embodiment.

Therefore, in this preferred embodiment, when the driving circuit 17 does not supply a voltage signal to each of the sub-pixel display elements 1, the particles 16 of black color are non-polarized. The incident light is incident upon the particles 16, and the three sub-pixel display elements 1 of a same one of the pixel display elements 1' display a black color. On the other hand, when the sub-pixel display element 1 is supplied with the voltage signal having the predetermined driving frequency by the driving circuit 17, the particles 16 are polarized so as to result in formation of strings of the particles 16 in the solution 15. The incident light enters into the sub-pixel display elements 1, is reflected by the second supports 12 of the sub-pixel display elements 1, and passes through the colored substrates of the first supports 11 so that the three sub-pixel display elements 1 of a same one of the pixel display elements 1' display a white color or a color that is blended in accordance with the intensities of the lights passing through the red, green and blue solutions.

Preferably, the colored substrate is a color filter.

Preferably, the second support 12 of each of the sub-pixel display elements 1 includes a white backlight source and a transparent substrate coupled to the white backlight source (not shown in FIGS. 5 and 6).

The fifth preferred embodiment of a color display device according to this invention has a structure and a driving mode similar to those of the fourth preferred embodiment, except that in the fifth preferred embodiment, the particles 16 of each of the sub-pixel display elements 1 have a white color, and the second support 12 of each of the sub-pixel display elements 1 has a black color.

Therefore, in this preferred embodiment, when the driving circuit 17 does not supply a voltage signal to each of the sub-pixel display elements 1, the particles 16 of white color are non-polarized. The incident light is reflected by the particles 16, and passes through the colored substrates of the first supports 11 so that the three sub-pixel display elements 1 of a same one of the pixel display elements 1' display a white color or a color that is blended in accordance with the intensities of the lights passing through the red, green and blue solutions. On the other hand, when the sub-pixel display element 1 is supplied with the voltage signal having the predetermined driving frequency by the driving circuit 17, the particles 16 are polarized so as to result in formation of strings of the particles 16 in the solution 15. The incident light enters into the sub-pixel display elements 1, and is incident upon the black second supports 12 of the sub-pixel display elements 1 so that the three sub-pixel display elements 1 of a same one of the pixel display elements 1' display a black color.

Figure 7:
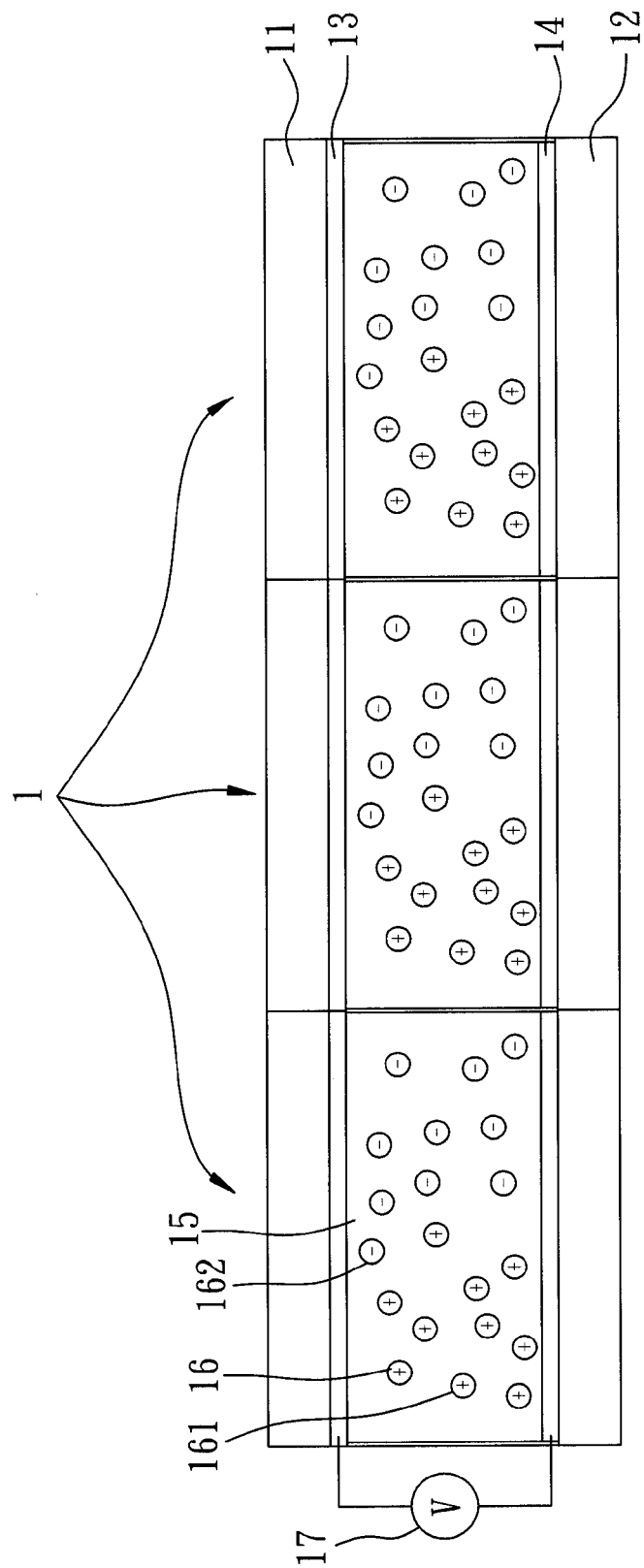
FIG. 7 is a schematic side view of another preferred embodiment of a color display device according to this invention under an off state.
Figure 8:
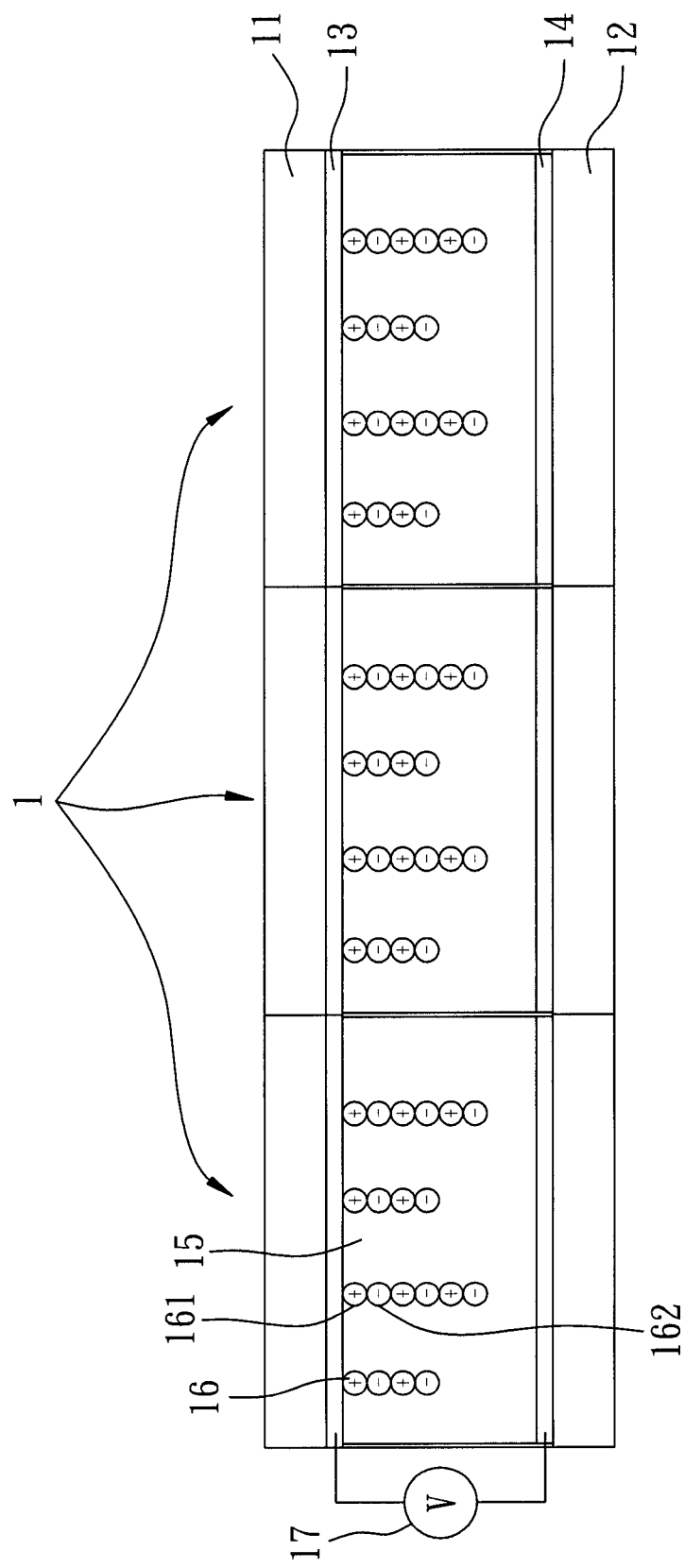
FIG. 8 is a schematic side view of the embodiment of FIG. 7 under an on state.

Referring to FIGS. 7 and 8, the sixth preferred embodiment of a color display device according to this invention has a structure and a driving mode similar to those of the first preferred embodiment, except that in the sixth preferred embodiment, the particles 16 of each of the sub-pixel display elements 1 include positively charged particles 161 and negatively charged particles 162. When the sub-pixel display element 1 is supplied with the voltage signal having the predetermined driving frequency by the driving circuit 17, the positively charged particles 161 and negatively charged particles 162 are electrically polarized and mutually attracted so as to result in formation of strings of the positively and negatively charged particles 161, 162 in the solution 15.

In view of the aforesaid, since the voltage signals supplied to the sub-pixel display elements 1 have the same predetermined driving frequency, the color display device according to this invention may be driven in a relatively simple manner.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A color display device, comprising:

a plurality of pixel display elements, each of which includes a plurality of sub-pixel display elements, each of said sub-pixel display elements including first and second supports, first and second electrodes attached to inner faces of said first and second supports, respectively, a solution disposed between said first and second electrodes, and particles dispersed in said solution, said first support, said first electrode and said solution being light-transmissive, said particles of said sub-pixel display elements of a same one of said pixel display elements being electrically polarizable under a predetermined driving frequency; and a driving circuit coupled electrically to said sub-pixel display elements for supplying a voltage signal to each of said sub-pixel display elements, the voltage signals supplied to said sub-pixel display elements having the same predetermined driving frequency;

wherein said first supports, said second supports, said solutions, and said particles of each of said pixel display elements are provided with respective color properties such that each of said sub-pixel display elements is able to display a first color when in a first display state, in which said particles are non-polarized and are randomly dispersed in said solution, and a second color when in a second state, in which said sub-pixel display element is supplied with the voltage signal having the predetermined driving frequency by said driving circuit to polarize said particles so as to result in formation of strings of said particles in said solution;

said sub-pixel display elements of a same one of said pixel display elements displaying different colors when in one of the first and second display states.

2. The color display device of claim 1, wherein said particles of said sub-pixel display elements have uniform weight characteristics.

3. The color display device of claim 1, wherein said particles of a same one of said sub-pixel display elements have the same color, and said particles of said sub-pixel display elements of a same one of said pixel display elements have different colors, respectively.

4. The color display device of claim 3, wherein said second support of each of said sub-pixel display elements has one of a white color and a black color.

5. The color display device of claim 1, wherein said particles of each of said sub-pixel display elements are neutral particles.

6. The color display device of claim 1, wherein said second supports of said sub-pixel display elements of a same one of said pixel display elements have different colors, respectively.

7. The color display device of claim 6, wherein said second support of each of said sub-pixel display elements includes a white backlight source and a colored transparent substrate.

8. The color display device of claim 6, wherein said particles of said sub-pixel display elements have a same color selected from the group consisting of white color and black color.

9. The color display device of claim 1, wherein said solutions of said sub-pixel display elements of a same one of said pixel display elements have different colors, respectively.

10. The color display device of claim 9, wherein said particles of said sub-pixel display elements have a black color, and said second supports of said sub-pixel display elements have a white color.

11. The color display device of claim 10, wherein said second support of each of said sub-pixel display elements includes a white backlight source, and a transparent substrate coupled to said white backlight source.

12. The color display device of claim 1, wherein said first support of each of said sub-pixel display elements includes a transparent substrate and a colored substrate stacked on said transparent substrate, said colored substrates of said sub-pixel display elements of a same one of said pixel display elements having different colors, respectively.

13. The color display device of claim 12, wherein said particles of each of said sub-pixel display elements have a black color, and said second support of each of said sub-pixel display elements has a white color.

14. The color display device of claim 12, wherein said second support of each of said sub-pixel display elements includes a white backlight source, and a transparent substrate coupled to said white backlight source.

15. The color display device of claim 12, wherein said particles of each of said sub-pixel display elements have a white color, and said second support of each of said sub-pixel display elements has a black color.

16. The color display device of claim 1, wherein said particles of each of said sub-pixel display elements include positively charged particles and negatively charged particles.

17. A color display device, comprising:
a plurality of pixel display elements, each of which includes three sub-pixel display elements, each of said sub-pixel display elements including first and second supports, first and second electrodes attached to inner faces of said first and second supports, respectively, a solution disposed between said first and second electrodes, and particles dispersed in said solution,
said first support, said first electrode and said solution being light-transmissive,
said particles of said sub-pixel display elements of a same one of said pixel display elements being electrically polarizable under a predetermined driving frequency; and
a driving circuit coupled electrically to said sub-pixel display elements for supplying a voltage signal to each of said sub-pixel display elements, the voltage signals supplied to said sub-pixel display elements having the same predetermined driving frequency;
wherein said first supports, said second supports, said solutions, and said particles of each of said pixel display elements are provided with respective color properties such that each of said sub-pixel display elements is able to display a first color when in a first display state, in which said particles are non-polarized and are randomly dispersed in said solution, and a second color when in a second state, in which said sub-pixel display element is supplied with the voltage signal having the predetermined driving frequency by said driving circuit to polarize said particles so as to result in formation of strings of said particles in said solution;
said sub-pixel display elements of a same one of said pixel display elements displaying red, green, and blue colors when in one of the first and second display states.

* * * * *